United States Patent
Schwenk

(10) Patent No.: US 7,970,135 B1
(45) Date of Patent: Jun. 28, 2011

(54) METHOD FOR THE SECURE, DISTRIBUTED GENERATION OF AN ENCRYPTION KEY

(75) Inventor: Joerg Schwenk, Dieburg (DE)

(73) Assignee: Deutsche Telekom AG, Bonn (DE)

( * ) Notice: Subject to any disclaimer, the term of this patent is extended or adjusted under 35 U.S.C. 154(b) by 1391 days.

(21) Appl. No.: 09/806,222

(22) PCT Filed: Jul. 6, 2000

(86) PCT No.: PCT/EP00/06388
§ 371 (c)(1),
(2), (4) Date: May 25, 2001

(87) PCT Pub. No.: WO01/08349
PCT Pub. Date: Feb. 1, 2001

(30) Foreign Application Priority Data

Jul. 27, 1999 (DE) .................................. 199 35 286

(51) Int. Cl.
H04L 9/00 (2006.01)
H04L 9/08 (2006.01)
H04L 9/20 (2006.01)
H04L 9/22 (2006.01)
H04L 9/26 (2006.01)

(52) U.S. Cl. ............... 380/46; 380/44; 380/28; 380/30; 380/277; 380/278; 380/282; 713/171; 713/168

(58) Field of Classification Search .......... 380/277–280, 380/27–32; 713/170–205
See application file for complete search history.

(56) References Cited

U.S. PATENT DOCUMENTS

| 5,142,579 | A | * | 8/1992 | Anderson | 380/30 |
| 5,201,000 | A | * | 4/1993 | Matyas et al. | 380/30 |
| 5,271,061 | A | * | 12/1993 | Crandall | 380/28 |
| 5,341,426 | A | * | 8/1994 | Barney et al. | 713/171 |
| 5,768,389 | A | * | 6/1998 | Ishii | 380/30 |
| 5,850,450 | A | * | 12/1998 | Schweitzer et al. | 380/30 |
| 5,864,667 | A | * | 1/1999 | Barkan | 713/201 |
| 5,937,066 | A | * | 8/1999 | Gennaro et al. | 380/286 |
| 5,963,646 | A | * | 10/1999 | Fielder et al. | 380/259 |
| 5,999,629 | A | * | 12/1999 | Heer et al. | 705/51 |
| 6,014,442 | A | * | 1/2000 | Enari | 380/277 |

(Continued)

FOREIGN PATENT DOCUMENTS
EP 0 534 420 9/1992

OTHER PUBLICATIONS

Gennaro, R. et al., "Two-Phase Cryptographic Key Recovery System", Computers & Security, vol. 16, Elsevier Science Ltd., 1997, pp. 481-506.

*Primary Examiner* — Syed A. Zia
(74) *Attorney, Agent, or Firm* — Kenyon & Kenyon LLP

(57) ABSTRACT

In a method for the secure, distributed generation of an encryption key for a cryptographic method, where the encryption key, as well as a public key are generated using deterministic methods from a large random number (seed), the seed (S) is generated on the user side by consulting variables known only to the user, and a public key (V) that is transmitted in advance from the trust center. Generation information suitable for generating the seed and, on the basis of which, the seed is able to be derived deterministically from the trust center, by consulting information known only to the center, is produced on the user side, and transmitted to the trust center to create the seed in parallel.

3 Claims, 1 Drawing Sheet

U.S. PATENT DOCUMENTS

| | | | |
|---|---|---|---|
| 6,081,785 A * | 6/2000 | Oshima et al. | 705/1.1 |
| 6,154,541 A * | 11/2000 | Zhang | 380/28 |
| 6,363,154 B1 * | 3/2002 | Peyravian et al. | 380/283 |
| 6,577,734 B1 * | 6/2003 | Etzel et al. | 380/277 |
| 2002/0126849 A1 * | 9/2002 | Howard et al. | 380/277 |
| 2004/0221170 A1 * | 11/2004 | Colvin | 713/193 |

* cited by examiner

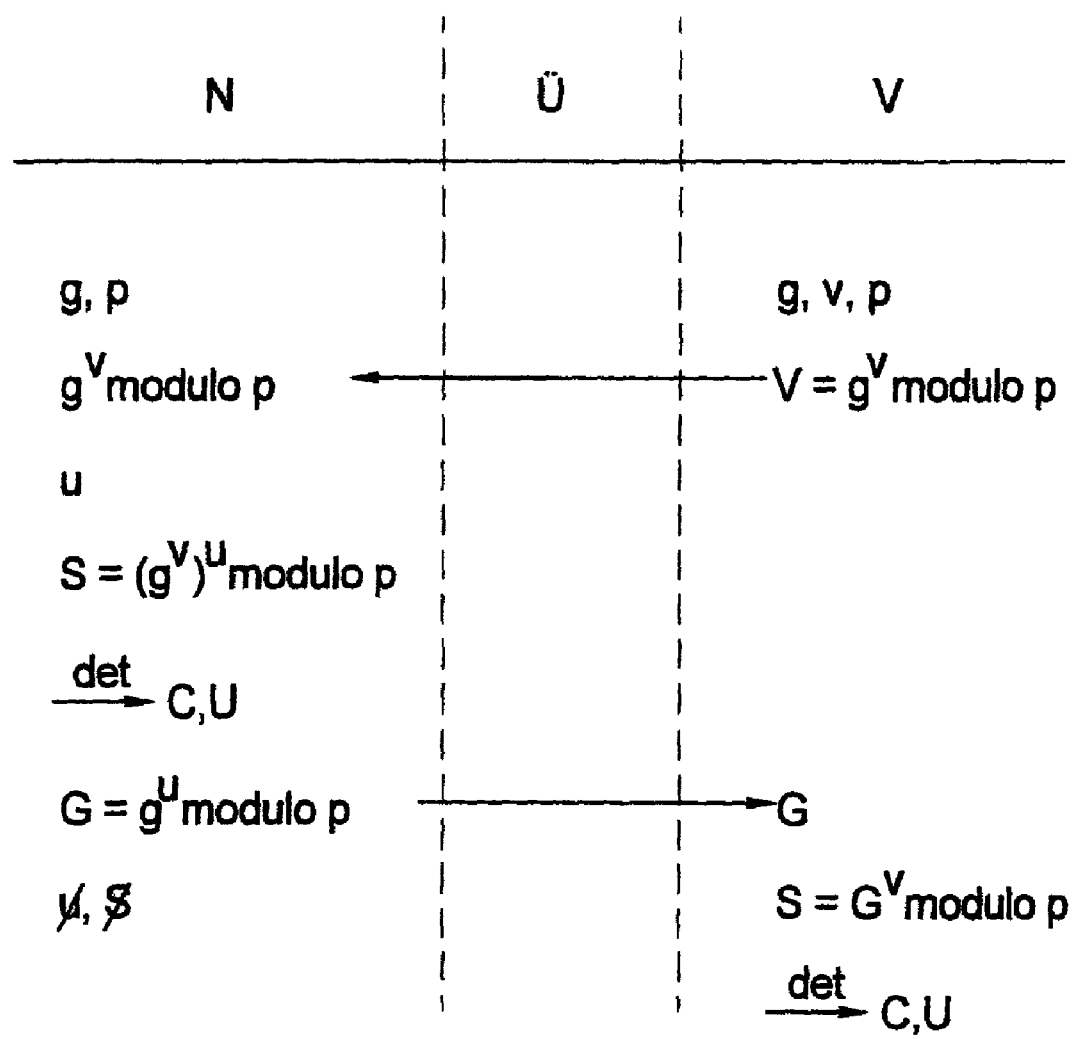

METHOD FOR THE SECURE, DISTRIBUTED GENERATION OF AN ENCRYPTION KEY

FIELD OF THE INVENTION

The present invention is directed to a method for the secure, distributed generation of an encryption key for a cryptographic method, the encryption key, as well as a public key being generated using deterministic methods from a large random number (seed).

BACKGROUND INFORMATION

To secure communications data and stored data, it is becoming increasingly prevalent to use the cryptographic technique of encryption. In this context, the data are enciphered under the control of a cryptographic key. The data can also be deciphered again using the same key. Marketable products and software libraries are available for this purpose.

In encryption operations, a so-called hybrid method is mostly used. In this method, the actual message is encrypted using a randomly selected symmetric key (session key) and a preselected symmetric encryption method (e.g., Data Encryption Standard (DES), International Data Encryption Algorithm (IDEA)). The session key is then encrypted, in turn, in each case using the public key of the receiver (a plurality of receivers is possible) and using a predefined asymmetric or public key method (e.g., Rivest, Shamir, Aldeman Code(RSA), ElGamal (a public key encryption algorithm)). The session key encrypted using this process is included with the encrypted message for each receiver. A description of this procedure and of the algorithms employed is found, for example, in William Stallings: "Cryptography and Network Security: Principles and Practice", Prentice Hall, Upper Saddle River, N.J., 1998.

To decode a message, the receiver must first decipher the session key using his private key, which belongs to his public key, and a preselected public key algorithm, to then decrypt the message using this session key.

Besides encrypting messages, cryptographic methods are also used to encrypt stored data, e.g., on one's own personal computer. Here as well, one typically employs a hybrid method, where the user first encrypts the data using a randomly selected symmetric key (session key) and a predefined symmetric encryption method (e.g., DES, IDEA). The session key is then encrypted, in turn, using the user's public key and a preselected asymmetric or public key method (e.g., RSA, ElGamal).

Using his or her private key, which belongs to his or her public key, and a predefined public key algorithm, the user first encrypts the session key and then, a using this session key, the stored data.

In the following, the term "encryption key" is used in each case to refer to the private key of the user, i.e., of the receiver.

The encryption key is either stored on a smart card, access to the smart card being protected by a personal identification number (PIN) known only to the user, or it is stored on another storage medium (for example a hard disk or diskette), in which case it is protected preferably by a long password.

It can happen that the encryption key is lost. For example, if the storage medium where it was located is destroyed, or if the user forgets the PIN number or the password which he or she used to secure the encryption key, then it is no longer possible to use it to access the encrypted data.

To be able to make encrypted data accessible again in the event the encryption key is lost, mechanisms are needed to enable the encryption key to be regenerated in a secure manner. For this purpose, the encryption key is typically generated nowadays at a trust center or a confidential central location and securely stored. As a rule, the encryption key is produced by initially generating a large random number (seed) using a statistically valid random process. From this random number, the key pair made up of the public key/private key is then generated with the aid of a deterministic method. This seed is subsequently deleted. If necessary, a copy of his or her encryption key is then delivered to the user for use.

In the process, the user does not have any influence on how his or her encryption key is generated and further handled by the generator. It is expensive to securely transport the copy of the encryption key to the user. As a transport medium, the smart card mentioned above can be used, for example, which is sent to the user.

SUMMARY OF THE INVENTION

The present invention provides a method of the type mentioned at the outset which can solve the aforementioned problems.

The present invention further provides a method eliminating the need to provide an expensive, secure transport of the encryption key to the user, when, in accordance with the present invention, the seed (S) is generated on the user side by consulting variables (u) known only to the user, and a public key (V) that is communicated in advance from the trust center. Suitable generation information (G) for generating this seed is produced on the user side. On the basis of this information, the seed may be derived deterministically from the trust center, by consulting information (v) known only to the center. The information is transmitted to the trust center to create the seed in parallel.

In this manner, the seed can be created in parallel, both by involving the user, as well as the trust center, without third parties being able to reconstruct the seed from possibly eavesdropped information. The user's private encryption key and his public key U can be derived from this seed using deterministic, generally known methods. Thus, the user is able to create his key himself from this seed, thereby eliminating the need for transporting the encryption key.

A first embodiment of the present invention provides for a mathematical mapping (or key agreement mapping) k: k(x, y)=z, for which it holds that:

a) $k(k(u,v),w)=k(k(u,w),v)$ for all $u,v,w$;

b) from the knowledge of $u$ and $k(u,v)$, in practice, one cannot infer $v$;

c) from the knowledge of $u$, $k(u,v)$ and $k(u,w)$, in practice, one cannot infer $k(k(u,w)v)$;

that a public parameter g known to the trust center and a secret key v available at the trust center are linked to the public key $V=k(g,v)$ of the trust center; that the public key V and a random number u selected on the user side are linked on the user side to the seed $S=k(V,u)$;

that a key pair made up of encryption key C and public user key U is derived from seed S on the user side using the predefined deterministic method;

that to enable seed S to be created, generation information $G=k(g,u)$ is generated on the user side and transmitted to the trust center; and that seed S is generated in parallel on the part of the trust center by $S=k(G,v)$.

Once information G is generated, the user should again destroy random number u and seed S for security reasons. Information G is generated on the user side under tap-proof conditions, for example within the user-side computer terminal, so that there is no chance of random number u or of seed S falling into the hands of the public. Without knowledge of secret key v, generation information G, by itself, may not be suitable for creating the seed and, therefore, does not need to be kept secret.

For that reason, generation information G can be sent over any tappable route (e-mail, WWW, ftp, . . . ) to the trust center.

Due to the property of the mapping k used, it holds that $k(G,v)=k(k(g,u),v)=k(k(g,v),u)=k(V,u)=S$, which effectively corresponds again to original seed S. Since the deterministic method, v and p, are known to the trust center, encryption key C can be readily reproduced by the trust center with the aid of generation information G, without knowledge of random number u. Encryption key C generated in parallel at the trust center can be stored there so as to be secure against tapping.

Examples of suitable key agreement mappings k are known from the theory of numbers. Provision can be made, for example, for key agreement mapping k to be a discrete exponential function modulo a large prime number p: $k(x,y):=x^y$ modulo p, and for public parameter g to be an element of a mathematical field GF(p) of a high multiplicative power, or for key agreement mapping k to be the multiplication on an elliptic curve. In practice, one should select the order of magnitude of the numbers used such that, even by summoning up modern technical means, it is impossible to calculate value y from values x and k(x,y), which, presupposing today's deciphering technology, is ensured at orders of magnitude of the prime numbers used of between 500 and 1000 bits.

One can find a description of such functions in William Stallings: "Cryptography and Network Security: Principles and Practice", Prentice Hall, Upper Saddle River, N.J., 1998. The present invention makes use of the Diffie-Hellman key exchange principle, which is likewise described in the mentioned work. The method of the present invention presupposes a trust center, which, if needed, can regenerate the encryption key with the aid of regeneration information R.

A further refinement of the method according to the present invention provides that the trust center selects a specific secret key vu for each user, that on the part of the trust center, instead of the general public key V, a user-specific key $Vu=k(g,vu)$ is generated and transmitted to the user to enable him to generate his key pair C and U. The user-specific secret key vu can, as can the general secret key v as well, be a statistically valid random number.

To ensure the functional reliability of the method, a next further refinement of the method of the present invention provides that the trust center does not transmit the information Vu needed by the user to create seed (S) until it has received generation information G.

This ensures that the trust center receives the generation information.

In yet another embodiment of the method, it is provided for there to be a plurality of trust centers which use key agreement mapping k and public parameter g. The user selects one or more of these trust centers, and with each of these, implements the method of the present invention, recovering each time a different portion Sv of seed S. To generate encryption key C, partial values Sv of seed S calculated by the trust centers are linked on the user side to the entire seed S. To create the entire seed S in parallel on the part of the trust centers, the selected trust centers must cooperate. Only by acting jointly can they generate seed S and, thus, encryption key C. This procedure can prevent encryption key C from being misused by an individual trust center or can prevent secret information from becoming known due to possible malfunctions at a trust center.

Another embodiment of the method provides for the various trust centers to use different functions kv and different public parameters gv. In this case, the user must carry out the method in accordance with the present invention for each trust center, and a different generation information Gv must be generated for each trust center.

BRIEF DESCRIPTION OF THE DRAWING

The FIGURE shows an embodiment of the present invention.

DETAILED DESCRIPTION

The FIGURE shows a diagram of the operations necessary for generating a reconstructible, user-specific seed S in parallel, as well as a key pair made up of encryption key C and public user key U in accordance with the method of the present invention. The user-side data occurring in succession are listed from top to bottom in the column designated by N. Ü denotes the data transmission link to a trust center V. Trust center V and user N have at their disposal public parameter g and large prime number p. Public key $V=g^v$ modulo p is generated by trust center V and transmitted by simple channels to user N. Using a random number u that he selects, the user then generates a seed S and generation information G, and deletes random number u again for security reasons. Generation information G is transmitted to trust center V. By applying a predefined deterministic method known equally to the user and the trust center, a public user key U, as well as a private, likewise user-specific encryption key C are generated from seed S. Here, encryption key C is used to decrypt messages or user data.

The invention claimed is:

1. A method for the secure, distributed generation of an encryption key for a cryptographic method effected by a computer, comprising:
   generating a seed S by the computer, the seed S being a large random number, on a side of a user by consulting at least one variable u known only to the user and a public key V that is transmitted in advance from a trust center;
   providing generation information G which is suitable for generating the seed S by the computer and from which the seed S is able to be derived deterministically from the trust center by consulting information v known only to the trust center, the generation information G being produced within a computer on the user side and transmitted via a computer to the trust center for creating the seed in parallel, so that encrypted data transmitted by the user to the trust center is decrypted by the trust center;
   providing a key agreement mapping k: $k(x,y)=z$, and wherein:
   a) $k(k(u,v),w)=k(k(u,w),v)$ for all u,v,w;
   b) from the knowledge of u and k(u,v), v cannot be inferred;
   c) from the knowledge of u, k(u,v) and k(u,w), k(k(u,w)v) cannot be inferred, w being a number;
   wherein a public parameter g known to the trust center and a secret key v available at the trust center are linked to the public key $V=k(g,v)$ of the trust center;
   wherein the public key V and the at least one variable u selected on the user side are linked on the user side to the seed $S=k(V,u)$;
   wherein a key pair made up of an encryption key C and a public user key U is derived from the seed S on the user side using a predefined deterministic method;

wherein to enable seed S to be created, generation information $G=k(g,u)$ is generated on the user side and transmitted to the trust center; and wherein seed S is generated in parallel at the trust center by $S=k(G,v)$;

providing a plurality of trust centers which use the key agreement mapping k and the public parameter g; the user selecting at least one trust center of the plurality of trust centers and with each of the at least one trust center the user recovers a respective value Sv of seed S, and the user generating an encryption key C, the respective value Sv of seed S calculated by the at least one trust center is linked on the user side to the entire seed S.

2. The method as recited in claim 1, wherein the trust center and the plurality of trust centers each use a respective different function kv and a respective different public parameter gv.

3. The method as recited in claim 1, wherein the trust center does not transmit the user-specific key $Vu=k(g,vu)$ to the user until the trust center has received the generation information G.

* * * * *